United States Patent Office 3,519,909
Patented July 7, 1970

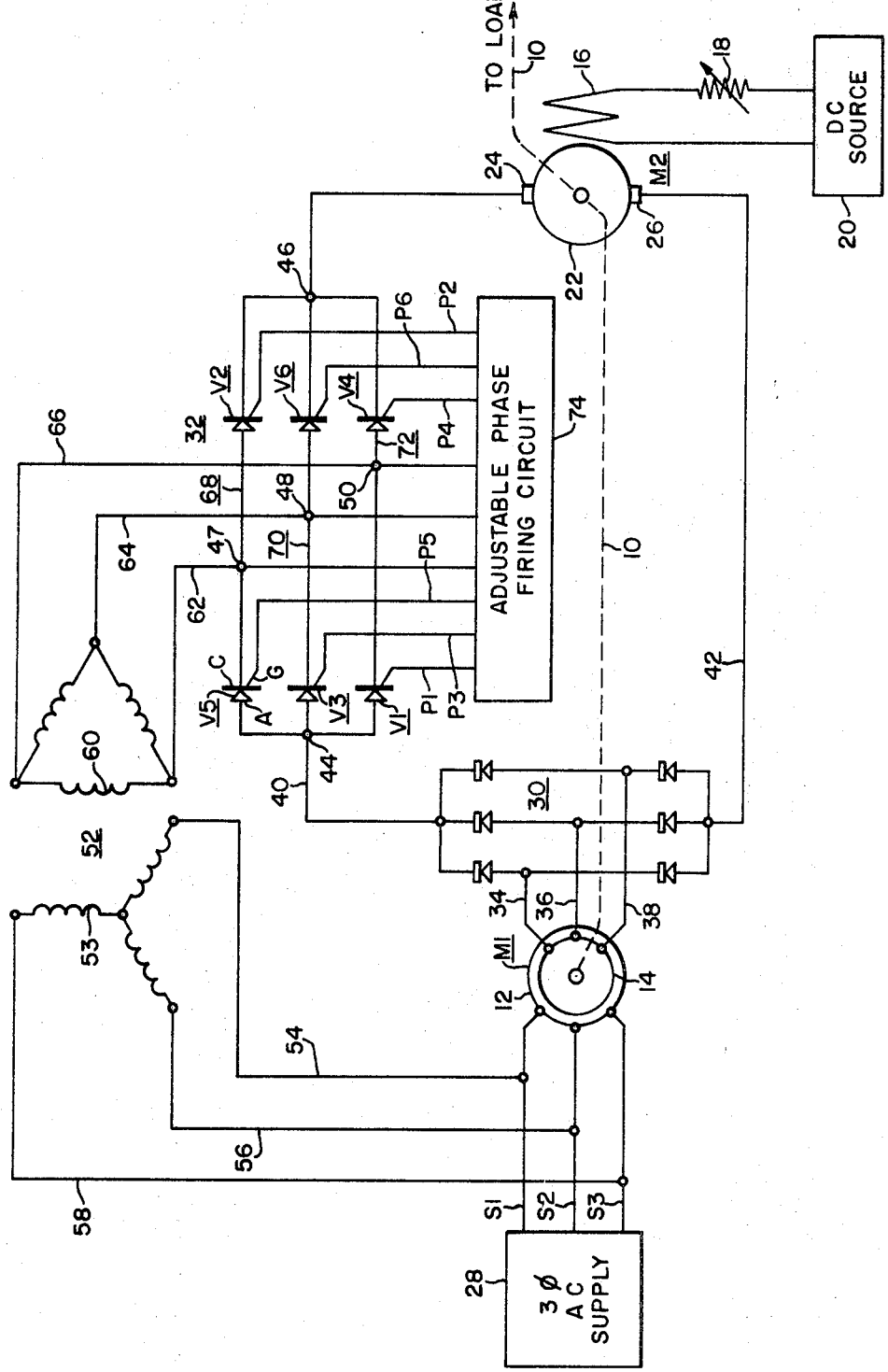

3,519,909
ADJUSTABLE SPEED MOTOR DRIVE USING A WOUND ROTOR OF AN INDUCTION MOTOR MECHANICALLY CONNECTED TO THE ARMATURE OF A D.C. MOTOR, BOTH ELECTRICALLY CONNECTED BY A CONTROL SYSTEM
Gerald E. Mathias, Buffalo, N.Y., and Lee A. Kilgore, Export, Pa., assignors to Westinghouse Electric Corporation, Pittsburgh, Pa., a corporation of Pennsylvania
Filed Oct. 23, 1967, Ser. No. 683,070
Int. Cl. H02k 17/34; H02p 7/80
U.S. Cl. 318—46
15 Claims

ABSTRACT OF THE DISCLOSURE

There is disclosed herein an adjustable speed motor drive system including a wound rotor AC (alternating current) motor and a separately excited DC (direct current) motor, whose rotors are mechanically coupled for common rotation. A rectifier rectifies the slip output of the AC motor rotor and applies the rectified output through an adjustable line-commutated converter to the armature of the DC motor. The converter is arranged to pass motor current from the AC motor rotor to the DC motor armature and to provide a voltage cumulative with the CEMF (counter-electromotive-force) of the motor in opposing the rectifier output voltage. By suitable control the converter is also operable to provide output voltage cumulative with the rectifier output voltage.

BACKGROUND OF THE INVENTION

In U.S. Pat. No. 2,970,249, there is disclosed an adjustable speed alternating current motor drive, wherein the respective rotors of a wound rotor AC motor and a separately excited DC motor are mechanically coupled, and a rectifier is connected between the rotor of the AC machine and the armature of the DC machine for applying rectified slip power from the AC motor to the DC motor. Speed control is obtained by changing the field current of the DC motor. A drive of this type is also described and discussed in the atricle "A-C Drive Offers System Design Flexibility" contained in the December 1960 issue of Electro-Technology, published by C-M Technical Publications Corp.

One of the limitations of this type of drive is a relatively small speed control range. The speed control is limited to the minimum speed at which the CEMF of the DC motor can equal the corresponding secondary voltage of the wound rotor motor. Assume for purposes of illustration, that the open circuit secondary voltage of the AC motor is assigned a value of 100%. For a particular drive of this type with a speed control range of 2:1, the secondary voltage of the AC motor would be 50% at the minimum controlled speed, and approximately 0% at full speed. The DC motor must be rated to have a CEMF equivalent to this 50% voltage at 50% speed. In accordance with the practice prior to the invention herein, to increase the speed range to 3:1 from 2:1 would require a DC motor that would provide a higher CEMF at an even lower speed. The motor would have to develop at 25% speed a CEMF equal to 75% voltage. This requires a larger and more expensive machine.

By modifying the system in accordance with the invention, is is not necessary to increase the size of the DC machine in order to extend the speed range of the machine. If desired the speed range could be extended from zero speed to maximum rated speed. In accordance with the invention, the DC power loop in such a motor drive system is modified by the insertion therein of an additional power control system having the characteristics of being able to provide a controllable voltage cumulative and in series with the CEMF of the DC motor armature and also having the ability to conduct motoring current flowing through the armature. In accordance with one embodiment this is accomplished by the use of a converter employing controlled electric valves.

Accordingly, it is a principal object of the invention to extend the speed range of an adjustable speed motor drive of the type employing an alternating current motor mechanically coupled to a DC motor and a rectifier for rectifying the slip voltage of the AC motor and applying it to the armature of the DC motor.

Other and further objects and advantages of the invention will become apparent from the following detailed description taken in connection with the single figure drawing which is a diagram illustrating a preferred embodiment of the invention.

DESCRIPTION OF THE PREFERRED EMBODIMENT

As seen in the drawing, an AC induction motor M1 and a separately excited DC motor M2 are mechanically coupled to a common load shaft 10. Motor M1 is provided with a stator 12 and a rotor 14 which, by way of example, respectively carry the primary and secondary windings of the machine. Rotor 14 is mechanically coupled to the shaft 10 either by directly mounting the rotor on the shaft or by other suitable coupling between the motor and the shaft 10 such as gearing, belting, etc. Motor M2 includes a field winding 16 carried for example by the stator of the machine and connected through an adjustable control 18 to a suitable source 10 of DC power. Motor M2 also includes a rotor 22 which by way of example carries the armature winding of the machine. Electrical access to the armature is through brush terminals 24 and 26. Rotor 22 is mechanically coupled to the load shaft 10 either by directly mounting the rotor on the shaft or by other suitable coupling such as gearing, belting, etc. Thus it is seen that motors M1 and M2 are mechanically coupled for common rotation which may be on a 1:1 basis or other ratio of revolutions per unit time. Direct mechanically coupled machines of this type are shown in the aforementioned U.S. Pat. 2,970,249 and in the aforementioned publication Electro-Technology.

The stator winding 12 is energized from a suitable three phase AC source 28 through supply conductors S1, S2 and S3. It may be noted that reference numeral 12 represents interchangeably the stator and stator winding, in this case the primary winding of the machine. Likewise, reference numeral 14 applies both to the rotor and the rotor winding, in this case the secondary winding of the machine. Similarly in the DC motor M2, the rotor and armature are represented by the reference numeral 22.

Slip power from motor M1 is rectified by a suitable rectifier 30 and applied through an adjustable control unit 32 to the armature 22 in a direction to oppose the CEMF of motor M2. Rectifier 30 is shown by way of example as a three phase diode bridge whose input is connected through leads 34, 36 and 38 to the rotor winding 14. The positive output of rectifier 30 is on line 40, while the negative output is on line 42. Line 40 is connected to a DC terminal 44 of control unit 32, and line 42 is connected to the armature 22 through brush terminal 26. The other brush terminal 24 of armature 22 is connected to another DC terminal 46 of control unit 32.

In addition to its DC terminals, control unit 32 also has AC terminals 46, 48 and 50 connected to a suitable source of AC power, for example the source 28, either directly or through a transformer 52, whose primary winding 53 is connected through leads 54, 56 and 58 to supply leads S1, S2 and S3, and whose secondary winding 60 is connected through leads 62, 64 and 66 to terminals 46, 48 and 50 respectively. Control unit 32 is so arranged that it will permit the passage of current out of rectifier 30 and into armature 22 in the motoring direction, and it (control unit 32) will provide at its DC terminals 44 and 46 at least a DC voltage whose polarity is such that it is in series with the rectifier 30 output and armature 22 and cumulative with the CEMF of armature 22, that is in aiding relation with the CEMF of the DC motor M2.

Control unit 32 may for instance be a current converter operable either in the rectifier mode or the inverter mode. By way of example, control unit 32 is shown as a line-commutated three phase bridge type converter configuration, wherein six controllable electric valves V1–V6 are connected in conventional three phase bridge configuration with one valve in each leg of the bridge so that each DC terminal 44 and 46 is connected to each AC terminal 46, 48 and 50 through a different one of the valves. More specifically, DC terminal 44 is connected through valve V5 to AC terminal 46, through valve V3 to AC terminal 46, through valve V3 to AC terminal 48, and through valve V1 to AC terminal 50, and DC terminal 46 is connected through valve V2 to AC terminal 46, through valve V6 to AC terminal 48, and through valve V4 to AC terminal 50.

The electric valves may be of any suitable type operable in a switching mode, such as vacuum tubes, transistors, gas type controlled rectifiers (example thyratron), solid state type controlled rectifiers (example silicon controlled rectifier), etc. By way of example, the electric valves are shown as solid state controlled rectifiers each having a pair of main power electrodes A and C and a control electrode G for controlling the current flow between the main electrodes. In the example shown the main electrode A is the anode, the main electrode C is the cathode, and the control electrode G is the gate terminal.

It may be seen from the disclosure that a bridge type converter may alternatively be described as having a plurality of branches connected in parallel between the DC terminals, each branch including in series a pair of electric valves with the cathode of one valve connected to the anode of the other, and with an AC line connected to the junction therebetween. More specifically in the example shown, there are connected between DC terminals 44 and 46 three parallel branches 68, 70 and 72. Branch 68 has in series valve V2, AC terminal 46, and valve V5; branch 70 has in series valve V3, AC terminal 48, and valve V6; and branch 72 has in series valve V1, AC terminal 50, and valve V4.

An adjustable phase firing circuit 74 supplies control of firing signals to the gates G of the valves in selected patterns to provide either inverter or rectifier operation as desired. The firing circuit 74 is powered from and synchronized with the AC from lines 62, 64 and 66, whereby firing signals supplied by the circuit 74 are synchronized with the line AC, that is they have a selected phase relation with the AC on those lines. Operating principles of controlled rectifiers and of line-commutated converters employing controlled rectifiers are well known in the art and need only brief mention here. Controlled rectifiers are gated (rendered conductive or fired) in response to the application of a control or gating signal on the control electrode when forward voltage is being applied to the controlled rectifier. In the case of a silicon controlled rectifier, it will fire in response to the application to its gate of a proper gate or firing signal while positive voltage is being applied to the anode. The gating or firing angle $\alpha$ of a controlled rectifier is the instant of initiation of conduction as related to the forward voltage wave applied across the valve. For convenience, the firing angle will be considered in terms of the angle $\alpha$ defined as the phase-control angle of retard from the firing angle which produces maximum rectifier D.C. voltage.

In order to obtain either rectification or inversion in a three phase full wave bridge type converter, the valves are gated 60° apart in the order illustrated by the suffix number of the reference character of each valve. For example, valves V1, V2, V3, V4, V5 and V6 are fired 60° apart in the order named. If the valves are fired at $\alpha=90°$, the average voltage and output current is zero. If the firing angle is at $\alpha<90°$, that is, in advance of 90°, then the converter operates in the rectifier mode providing an output voltage which is positive on terminal 46 and negative on terminal 40. D.C. voltage provided by the rectifier mode may be referred to as being in the positive sense. On the other hand, if the firing angle is at $\alpha>90°$, that is, retarded beyond 90°, then the average output voltage assumes a negative sense (reverse of that of the rectifier mode). But since the current retains its original polarity the process involves the reversal of power flow and is defined as inverter operation. Thus, when angle $\alpha$ is less than 90°, the converter operates in the rectifier mode, and when the angle $\alpha$ is greater than 90°, the converter operates in the inverter mode. Also from the above it is seen that the D.C. voltage at the D.C. terminals of a line-commutated or synchronous converter is proportional to cos $\alpha$.

Rectifier and inverter modes of operation of line-commutated or synchronous converters are more fully explained in the following publications: Westinghouse "Silicon Controlled Rectifier Designers Handbook" published by the Westinghouse Electric Corporation, first edition, 7–2, 7–3, 7–4 and 7–5; and "Principles of Inverter Circuits," by Bedford and Hoft, published by John Wiley and Sons, Inc., pages 62–67 and 73–87.

The gating signal source 74, when turned on, supplies firing pulses P1, P2, P3, P4, P5 and P6, 60° apart in the order named on lines correspondingly labeled P1, P2, P3, P4, P5 and P6 respectively. Each of these lines is connected to the valve bearing the same suffix reference numeral. For example, line P1 is connected to the gate of valve V1, line P2 is connected to the gate of valve V2, and so on. The firing system 74 is properly synchronized with the AC supplied on lines 62, 64 and 66 in order to apply the firing pulses to the corresponding valves when forward voltage is across the valves. It will be understood by those skilled in the art that in addition to the pulse lines shown connected to the gates of the respective valves, there are also complementary lines from the firing circuit to the cathodes of the corresponding valves. These cathode connections are not shown in order to simplify the drawing. The aforedescribed pulse sequences for the firing circuits 74, is cyclic.

Firing circuit 74 is arranged to provide adjustability of the phase of the firing pulses relative to the AC supply waves in order to adjust the firing angle $\alpha$ of the valves ranging from $\alpha$ to less than 90° to $\alpha$ greater than 90°, for example the circuit 74 may be arranged to provide adjustment of the phase angle of its output pulses to furnish a firing angle $\alpha$ ranging from zero degrees to 180°, which provides full ranges in both rectifier and inverter modes. Such firing circuits are well known in the art and need no description herein.

In the rectifier mode, control unit 32 provides a DC voltage that is positive at terminal 46 and negative at terminal 44. Operating in the inverter mode, control unit 32 provides a DC voltage which is negative at terminal 46 and positive at terminal 44. The CEMF of armature 22 is positive at terminal 24 and negative at terminal 26. Thus, it is seen that when the control unit 32 is operating in the inverter mode, the DC voltage provided by it at terminals 44 and 46 is in series aiding with the CEMF of the armature 22, that is the two voltages are cumulative in opposing the rectified slip voltage provided by rectifier 30. Operation of the control unit 32 in the inverter mode extends the speed range of the system for a given size or rated DC motor M2. It should be noted that even when providing DC voltage in the negative sense, the operation of control unit 32 is such as to pass current to the motor in the motoring direction.

Considering again the example problem discussed under Background of the Invention, the speed control range of that example can be increased from 2:1 to 3:1, without increasing the size of the motor, by inserting into the DC loop a voltage cumulative with the CEMF of armature 22 and controllable for the range of 0% to 25% volts. Applying the figures of that example to the system disclosed, suppose that with zero volts between terminals 40 and 46, the system has a 2:1 speed control range. At zero speed, the rectified slip voltage at output rectifier 30 may be represented by the quantity 100%. With a 2:1 speed control range, the secondary voltage (slip voltage) of motor M1 is 50% at the minimum controlled speed and approximately zero at full speed. To increase the speed range to 3:1 from 2:1 without benefit of the control unit 32 would require a motor M2 that should develop a higher CEMF at even a lower speed. The motor would have to develop a 25% speed a CEMF equal to 75% of the rectified slip voltage. This would require a larger and more expensive machine. It is not necessary to increase the size of the DC motor M2 if the control unit 32 is operated in the inverter mode to provide a DC voltage cumulative with the CEMF of armature 22 and controllable for the range of 0% to 25% volts. An additional range of control volts would provide additional speed range for the drive. It may be noted that in this type of operation, slip energy is fed back into the main lines electrically through control unit 32 and mechanically through torque produced by the DC motor M2.

In addition to the slip energy supplied by rectifier 32 to the DC motor M2, energy from lines 62, 64 and 66 may if desired be supplied to the motor M2 by adjusting the phase-angle α of the firing pulses to operate the control unit 32 in the rectifier mode.

From the description herein it should now be apparent that the invention provides extended speed control range in a simple and economic manner. Although useful in all horsepower ranges, the invention is especially effective at very high horsepowers—for example of the order of 10,000 H.P.

To simplify the understanding of the invention, the system shown does not include optional embellishments, for example, such as are shown in the aforementioned publication. These may include starting resistors which can be switched into the rotor output lines 34, 36 and 38 for starting purposes, and then shorted out after starting. Another expedient may be an adjustable autotransformer in the secondary lines 34, 36 and 38 to provide a more complete acceleration control.

Although a line-commutated converter is shown by way of example, it should be understood that other types of control units may be employed. For example if only inverter operation is desired any suitable inverter may be employed. If both inverter and rectifier modes are desired, any suitable converter operable in these modes may be used.

It is to be understood that the herein described arrangements are simply illustrative of the principles of the invention, and that other embodiments and applications are within the spirit and scope of the invention.

We claim as our invention:

1. In an adjustable speed motor drive system including an AC motor and a DC motor mechanically connected together for correlated rotation, and wherein the AC motor includes primary and secondary windings and the DC motor includes an armature with a winding thereon, and wherein rectifier means is connected between said secondary and armature windings for rectifying slip voltage of the AC motor and supplying the rectified slip voltage to said armature winding, control means interposed between the rectifier and the armature winding, said control means being arranged to provide a voltage in series with the rectified slip voltage and the counter-electromotive-force of the armature, said control means being arranged to pass motoring action armature currents flowing from said secondary winding to said armature winding.

2. The combination of claim 1 wherein said control means is adjustable to provide variable voltage.

3. The combination of claim 1 wherein said control means provides a voltage cumulative with said counter-electromotive-force in opposing said rectified slip voltage.

4. The combination of claim 3 wherein said control means is adjustable to provide a variable voltage cumulative with the armature counter-electromotive-force.

5. The combination as in claim 1 wherein the AC motor has a rotor which carries said secondary winding and wherein said armature comprises a rotor which carries said armature winding, and wherein said rotors are mechanically connected together for said correlated rotation.

6. The combination as in claim 1 wherein said control means comprises an inverter having DC terminals connected in series with said armature winding and AC terminals for connection to an AC source, said inverter providing passage of armature current and also providing a voltage cumulative with the counter-electromotive-force of the DC motor.

7. The combination of claim 6 wherein said inverter is a line-commutated inverter.

8. The combination as in claim 1 wherein said control means is selectively operable in either the inverter mode or the rectifier mode, said control means comprising DC terminals connected in series with said armature winding, AC terminals for connection to an AC source, and controllable switch means for interconnecting the DC terminals to provide at the DC terminals a voltage of a desired polarity.

9. The combination as in claim 8 wherein said switch means comprises controlled rectifiers.

10. The combination as in claim 1 wherein said control means comprises a bridge type converter which comprises a plurality of AC terminals for connection to an AC source, a pair of DC terminals connected in series with said armature winding, a plurality of parallel current paths connected between said DC terminals, each polarity, a plurality $n$ of first controled electric valves, in series with the anode of one connected to the cathode of the other, the junction between each pair of valves being connected to a different one of said AC terminals, and conduction controlling means connected to said valves for operating said converter to provide a DC voltage of desired polarity at said DC terminals.

11. The combination as in claim 1 wherein said control means comprises a bridge type converter which comprises a plurality $n$ of AC input terminals for connection to an AC source, a pair of DC output terminals one of particular polarity and the other of opposite polarity, a plurality $n$ of first controlled electric valves each connected between the particular polarity DC terminals of the bridge and a different one of the AC terminals of the birdge, a plurality $n$ of second controlled electric valves each connected between the opposite polarity DC terminal of the birdge and a different one of the AC terminals of the bridge, all said valves being poled alike relative to the DC terminals of the bridge circuit, and means for controlling the conduction times of said valves to provide an output voltage at said DC terminals of desired polarity, said DC terminals being connected in series with said armature winding.

12. The combination of claim 1 wherein said control unit comprises an inverter providing at its DC terminals a voltage opposed to said counter-electromotive-force.

13. The combination of claim 12 wherein said inverter is a line-commutated inverter.

14. The combination of claim 1 wherein said control unit comprises a converter operable in both the inverter and rectifier modes.

15. The combination of claim 14 wherein said converter is a line-commutated converter operable in both the inverter and rectifier modes.

References Cited

UNITED STATES PATENTS

| | | | |
|---|---|---|---|
| 2,066,508 | 1/1937 | Young | 318—49 |
| 2,288,338 | 6/1942 | Willis | 318—197 |
| 2,359,145 | 9/1944 | Myers | 318—46 |
| 2,970,249 | 1/1961 | Mazur | 310—112 |
| 3,059,159 | 10/1962 | Reza | 318—46 |
| 3,066,250 | 11/1962 | Sogni | 318—46 |
| 3,136,937 | 6/1964 | Miljanic | 318—197 |
| 3,210,629 | 10/1965 | Hornbarger | 318—46 |
| 3,327,189 | 6/1967 | Hedstrom | 318—237 |

ORIS L. RADER, Primary Examiner

A. G. COLLINS, Assistant Examiner

U.S. Cl. X.R.

318—49, 197